(12) United States Patent
Allais et al.

(10) Patent No.: US 7,709,742 B2
(45) Date of Patent: May 4, 2010

(54) SUPERCONDUCTOR CABLE

(75) Inventors: Arnaud Allais, Hannover (DE); Frank Schmidt, Langenhagen (DE); Erik Marzahn, Braunschweig (DE)

(73) Assignee: Nexans, Paris (FR)

( * ) Notice: Subject to any disclaimer, the term of this patent is extended or adjusted under 35 U.S.C. 154(b) by 343 days.

(21) Appl. No.: 11/384,033

(22) Filed: Mar. 17, 2006

(65) Prior Publication Data

US 2006/0272847 A1    Dec. 7, 2006

(30) Foreign Application Priority Data

Apr. 27, 2005    (EP) .................................. 05290926

(51) Int. Cl.
 *H01B 12/00*    (2006.01)
(52) U.S. Cl. .................................. 174/125.1; 174/15.4
(58) Field of Classification Search ............. 174/125.1, 174/15.4, 15.5; 29/599
See application file for complete search history.

(56) References Cited

U.S. PATENT DOCUMENTS

| | | | | |
|---|---|---|---|---|
| 3,603,715 A | * | 9/1971 | Eilhardt et al. ............. | 174/15.5 |
| 3,604,833 A | * | 9/1971 | Beck ......................... | 174/15.5 |
| 3,758,701 A | * | 9/1973 | Schmidt ...................... | 174/28 |
| 4,259,990 A | * | 4/1981 | Rohner ........................ | 138/113 |
| 7,237,317 B2 | * | 7/2007 | Schippl ...................... | 29/599 |
| 7,238,887 B2 | * | 7/2007 | Hirose ...................... | 174/125.1 |
| 2002/0170733 A1 | * | 11/2002 | Rasmussen ................. | 174/68.1 |

FOREIGN PATENT DOCUMENTS

JP    405144332 A  *  6/1993

* cited by examiner

*Primary Examiner*—Ishwarbhai B Patel
(74) *Attorney, Agent, or Firm*—Sofer & Haroun, LLP

(57) ABSTRACT

A superconductor cable is described, having a superconductive flexible cable core (1), which is laid in a cryostat (2, 3, 4), in which the cable core (1) runs in the cryostat (2, 3, 4) in the form of a wave or helix at room temperature.

6 Claims, 1 Drawing Sheet

SUPERCONDUCTOR CABLE

GOVERNMENT LICENSE RIGHTS

This invention was made with government support under contract No. DE-FC36-00GO13032 awarded by the Department of Energy (DOE). The government has certain rights in the invention.

RELATED APPLICATION

This application is related to and claims the benefit of priority from European Patent Application No. 05290926.4, filed on Apr. 27, 2005, the entirety of which is incorporated hereing by reference.

FIELD OF THE INVENTION

The invention relates to a superconductor cable having a superconducting flexible cable core, which is laid in a cryostat.

BACKGROUND

To produce a superconductor cable, a superconducting cable core is produced and subsequently drawn into a cryostat, or the superconducting cable core is enveloped by the individual components of the cryostat in a continuous operation.

In the production of the superconductive flexible cable core, first a multiplicity of superconductive strips are laid around a strand of copper wires with a relatively great length of lay. Subsequently, a number of layers of insulating material in strip form are laid onto the layer of superconductive strips. Generally, strips of paper or strips laminated with plastic are wound onto the layer of superconductive strips. Over this layer of insulating material, the shielding is applied, comprising at least one layer of superconductive strips, which are wound onto the insulating layer with a great length of lay. Over the outer superconductive layer there is also a layer of copper strips.

A superconductor cable arranged in a cryostat is known for example from DE 102 21 534 A1. Since the production of the superconductor cable and its enclosure in the cryostat are performed at room temperature, but the operation of the superconductor cable takes place below the transition temperature of the superconductive material, a contraction of the superconductor cable takes place while it is cooling down, for example, when cooling down from 300 K to 77 K, a contraction of about 0.3%. In the case of a cable length of, for example, 600 m, consequently the contraction of the cable core is, for example, 1.8 m.

A problem therefore arises, inasmuch as it is necessary to compensate for the contraction occurring during the cooling down by means of an excess length of the cable core, since otherwise strong tensile forces would be exerted by the cable core and could lead to it being damaged.

To solve this problem, it is known from DE 10 2004 019 141 to draw a superconductive cable core off from a supply, envelop the cable core with a longitudinally running-in metal strip, shape the metal strip into a tube, weld the longitudinal edges and corrugate the welded tube, the inside diameter of the corrugated tube being greater than the diameter of the cable core. The cable core and the corrugated metal tube are then wound up onto a cable drum. The ends of the cable core are mechanically connected to each other at the ends of the corrugated tube while the cable core and the corrugated tube are located on the cable drum. On account of the rigidity of the cable core, during winding-up it comes to bear against the inside wall of the metal tube outside it, i.e. the cable core has the tendency to assume the greatest possible winding diameter, whereby the excess length of the cable core with respect to the metal tube is produced.

OBJECTS AND SUMMARY

The present invention is based on the object of providing a possible way of making the contraction occurring during cooling down harmless for the superconductor cable.

This object is achieved by the features composed in the characterizing clause of Patent Claim 1. Further advantageous refinements of the invention are composed in the subclaims.

BRIEF DESCRIPTION OF THE DRAWINGS

The invention is explained in more detail on the basis of the exemplary embodiments schematically represented in FIGS. 1 and 2.

DETAILED DESCRIPTION

Figure 1:
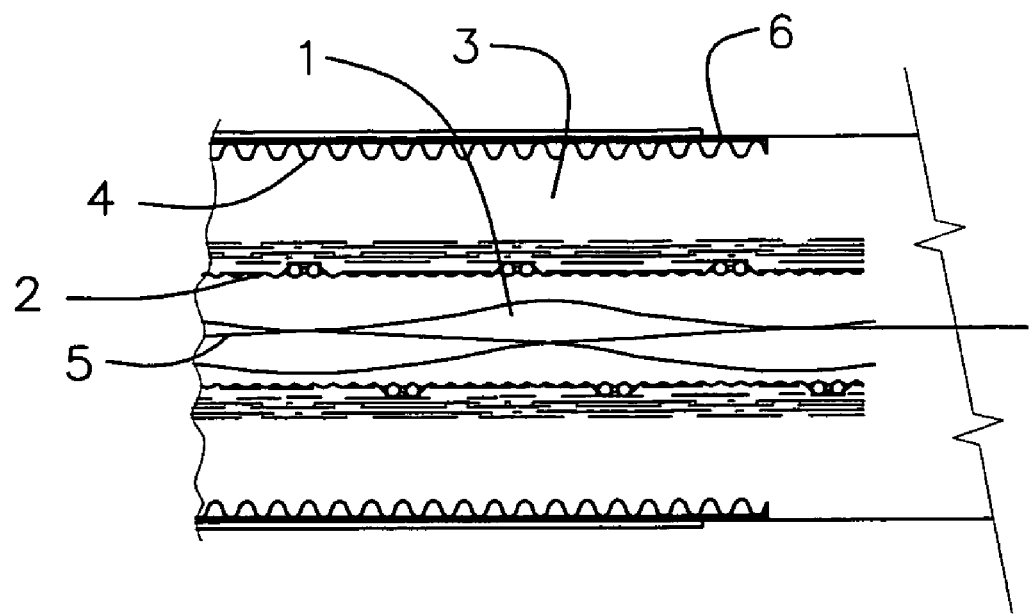
FIG. 1 shows a lateral section through a cryostat, in accordance with one embodiment of the present invention.

FIG. 1 shows a lateral section through a cryostat, which surrounds a superconductive cable core 1. The cryostat comprises a corrugated metal tube 2, a superinsulation 3 and a corrugated metal tube 4. The corrugated metal tubes 2 and 4 are produced in a continuous operation by shaping a metal strip into a slit tube, welding the slit and subsequently corrugating. The superinsulation 3 comprises alternately applied layers of reflective metal foils and thermally nonconducting material, such as for example glass fibre nonwoven. In addition, the space between the metal tubes 2 and 4 is evacuated.

The superconductor cable may be produced by pushing the metal tube 2, provided with the superinsulation 3, into the metal tube 4. The cable core 1 may be drawn into the metal tube 2 before or after this.

Suitable for the production of great lengths is a method in which first a metal strip is shaped into a tube around the cable core drawn off continuously from a supply reel, the tube is welded along its longitudinal seam and subsequently corrugated. The superinsulation 3 is applied to this metal tube 2 and the metal tube 4 is applied on top—in the same way as described for the metal tube 2. A plastic sheath is denoted by 6.

According to the teaching of the invention, the cable core 1 runs in the form of a wave line or helix when the superconductor cable is at room temperature, which is the normal case during production. As a result, an "excess length" of the cable core is created in the cryostat. The wave form or helix is fixed by one or more elements 5, for example wires or strips, of a metal with an extremely low coefficient of thermal expansion, which are connected, for example by soldering or welding, at predetermined intervals to the outer surface of the cable core 1, which comprises a banding of copper.

Invar steel is preferred as the material for the wires or strips.

Figure 2:
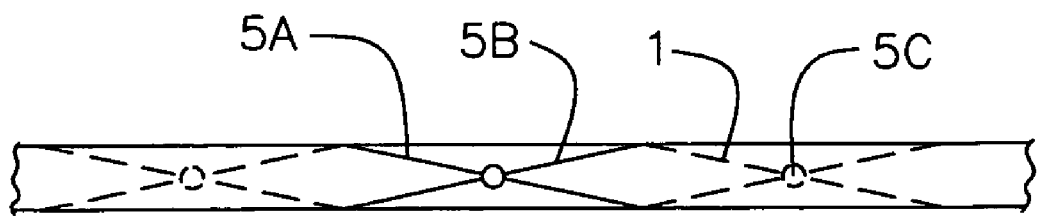

A preferred exemplary embodiment of the cable core 1 is shown in FIG. 2. Two wires 5a and 5b are laid onto the cable core with a great length of lay. The direction of lay of the wire 5a is opposite to the direction of lay of the wire 5b. At the crossing points 5c, the wires 5a and 5b are mechanically firmly connected to each other and to the cable core 1. For this purpose, the cable core 1 has an outer metallic layer (not represented).

When the superconductor cable is put into operation, liquid nitrogen is introduced into the space inside the metal tube 2. The cable core thereby cools down and contracts. At the same time, the wave form is virtually eliminated. The extent of the cable core 1 in the longitudinal direction of the superconductor cable corresponds to the length of the cryostat both at room temperature (300 K) and at the operating temperature (77 K) of the cable.

The invention claimed is:

1. Superconductor cable comprising: a superconductive flexible cable core, which is laid in a cryostat, wherein at room temperature the cable core runs in the cryostat in the form of a wave or helix due to an excess length relative to a length of said cryostat, for compensating for the contraction occurring during cooling down to operating temperature, and in that one or more elements is fastened on the cable core at specific points at longitudinally axial intervals, the one or more elements being made of a material with a low coefficient of thermal expansion and wherein said one or more elements includes at least two wires or strips running around the cable core in the form of a helical line with opposed direction of lay, which are mechanically firmly connected to each other and to the cable core at their crossing points.

2. Superconductor cable according to claim 1, wherein the one or more elements is made of invar steel.

3. Superconductor cable according to claim 1, wherein the one or more elements is spot-welded or spot-soldered to an outer metallic shielding of the cable core.

4. Superconductor cable comprising: a superconductive flexible cable core, which is laid in a cryostat, wherein at room temperature the cable core runs in the cryostat in the form of a wave or helix and in that one or more elements is fastened on the cable core at specific points at longitudinally axial intervals, said one or more elements being made of a material with a low coefficient of thermal expansion, wherein said one or more elements includes at least two wires or strips running around the cable core in the form of a helical line with opposed direction of lay, which are mechanically firmly connected to each other and to the cable core at their crossing points.

5. Superconductor cable according to claim 4, wherein the one or more elements is made of invar steel.

6. Superconductor cable according to claim 4, wherein the one or more elements is spot-welded or spot-soldered to an outer metallic shielding of the cable core.

* * * * *